United States Patent

Relles

[15] 3,696,158
[45] Oct. 3, 1972

[54] CONVERSION OF ACETYLBENZENES TO UNSATURATED DERIVATIVES

[72] Inventor: Howard M. Relles, Rexford, N.Y.

[73] Assignee: General Electric Company, N.Y.

[22] Filed: Aug. 26, 1970

[21] Appl. No.: 67,213

[52] U.S. Cl. ........................... 260/668 R, 260/651 R
[51] Int. Cl. .............................................. C07c 15/04
[58] Field of Search ............................. 260/651, 668

[56] References Cited

UNITED STATES PATENTS

| | | | |
|---|---|---|---|
| 3,303,229 | 2/1967 | deRosset | 260/668 R |
| 3,542,888 | 11/1970 | d'Ostrowick et al. | 260/668 R |
| 3,594,423 | 7/1971 | Relles | 260/668 R |

Primary Examiner—Curtis R. Davis
Attorney—James W. Underwood, Richard R. Brainard, Joseph T. Cohen, Charles T. Watts, Paul A. Frank, Frank L. Neuhauser, Oscar B. Waddell and Joseph B. Forman

[57] ABSTRACT

Although phosgene itself does not react with the carbonyl group of acetylbenzenes, the adduct of phosgene and pyridine will react converting the acetyl group to either the $\alpha$-chlorovinyl or $\alpha, \alpha$-dichloroethyl group. The $\alpha,\alpha$-dichloroethyl group can be converted to the $\alpha$-chlorovinyl group and the latter can be dehydrohalogenated to the ethynyl group. This reaction permits low cost phosgene to be substituted for the much more expensive phosphorus pentachloride thereby providing an economical process for converting acetylbenzenes to the corresponding ethynylbenzenes which are useful in making polyacetylenes.

8 Claims, No Drawings

CONVERSION OF ACETYLBENZENES TO UNSATURATED DERIVATIVES

This invention relates to a process of converting acetylbenzenes to their corresponding α-chlorovinyl-benzenes using phosgene, in the presence of pyridine, as the halogenating agent. This invention further contemplates the dehydrohalogenation of the α-chlorovinylbenzenes to their corresponding ethynyl-benzenes. More particularly, this invention relates to the conversion of acetophenone, m-diacetylbenzene, p-diacetylbenzene or mixtures thereof to α-chlorostyrene, m-bis(α-chlorovinyl)benzene, p-bis-(α-chlorovinyl)benzene and mixtures thereof as well as the further conversion of these products to phenyl acetylene, m-diethynylbenzene, p-diethynylbenzene and mixtures thereof.

Polymeric acetylenes and a process for producing the same are disclosed in U.S. Pat. No. 3,300,456 – Allan S. Hay. The polymers from diethylnylbenzenes are an extremely interesting group of polymers since they contain over 90 percent by weight carbon. The monoethynylbenzenes, for example, phenylacetylene, can be used as chain-stoppers to regulate the molecular weight of the polymers from the diethynylbenzenes. Furthermore, the ethynylbenzenes are useful in making photosensitive compositions as disclosed in the copending application of Allan S. Hay, Ser. No. 764,287, filed Oct. 1, 1968 and assigned to the same assignee as the present invention.

Because of the wide utility for the polyacetylenic polymers as disclosed in the aforementioned patent and patent application, it would be highly desirable to have an economical process for producing the ethynyl-benzenes required as starting materials for the polymers and for the chain-terminating, molecular weight regulators.

Generally, ketones react with halogenating agents to produce haloketones. Unlike phosphorus pentabromide which brominates ketones to bromoketones, phosphorus pentachloride reacts with ketones to produce gem-dichlorides, wherein the halogens have replaced the oxygen of the ketone. In the case of aralkyl ketones, i.e., the ketonic carbonyl group is between an aryl and alkyl group, the gem-dichloride spontaneously dehydrohalogenates so that most of the product is the α-chloroolefin. Since the gem-dichloride and the α-chloroolefin can both be readily dehydrohalogenated to the corresponding acetylenic compound, the gem-dichloride does not have to be separated from the α-chloroolefin prior to dehydrohalogenation to produce the acetylenic compounds.

From a laboratory preparation standpoint, the use of phosphorus pentachloride for producing the chloro derivative followed by dehydrohalogenation is a satisfactory method for converting ketones to the corresponding acetylenes, see for example, Chapter I, entitled "Synthesis of Acetylenes," written by Thomas L. Jacobs in Volume 5 of Organic Reactions, John Wiley & Sons, Inc., New York (1949) and Methods 43 and 72 and the literature references cited therein, in the book "Synthetic Organic Chemistry" by Wagner and Zook, John Wiley & Sons, Inc., New York (1953). Unfortunately, because of the high cost of phosphorus pentachloride and because only two out of the five chlorines can be utilized in the chlorination reaction, this method is too expensive to be commercially feasible for the conversion of acetophenone, m-diacetylbenzene and p-diacetylbenzene to their corresponding α-chloroolefins and further to their acetylenic derivatives.

Unexpectedly, I have found that although phosgene will not react directly with acetylbenzenes, it will react in the presence of pyridine. The reaction apparently is unique to pyridine since it will not work with the closely related quinoline. I have further found that the reactivity is a function of the amount of pyridine. To attain a reasonable reaction rate, there should be at least one mole of pyridine for each mole of phosgene to be reacted and preferably up to at least three moles of pyridine for each mole of phosgene to be reacted. I have further found that the reaction of phosgene in the presence of pyridine produces both α-chlorovinyl and α,α-dichloroethyl groups directly with the former predominating.

The reaction is preferably carried out in a solvent which is non-reactive toward any of the reactants or products and is a good solvent for all of the reactants. It also should preferably have a boiling point which makes it easily separated from the balance of the reaction mixture. Particularly good solvents are the liquid chlorinated aliphatic hydrocarbons with chloroform being preferred, since it is capable of holding a considerable amount of phosgene in solution at ambient temperature and pressure without significant loss due to volatility. The reaction is preferably carried out at or near room temperature. As the temperature is increased, the amount of phosgene lost from the reaction mixture increases, even when chloroform is the solvent and pyridine is present to form a complex with it unless a pressure vessel is used to prevent the escape of phosgene. However, under these conditions, a poorer yield is obtained than if the reaction is run at ambient temperature and pressure.

Generally, the reaction is carried out by dissolving the acetylbenzene and pyridine in the solvent and passing phosgene into the reaction mixture until there is an excess of phosgene dissolved in the solution, as determined by a difference in weight of either the reaction vessel or the phosgene container. Generally at this point, there will be some white solid precipitate due to the reaction mixture being saturated with the phosgene-pyridine complex. The reaction mixture is allowed to stir at ambient conditions of temperature and pressure until the desired degrees of reaction has been attained as determined by analysis of the reaction mixture which can be done conveniently by nmr spectroscopy.

The rate of reaction will decrease as the degree of reaction increases and it is more economical to stop the reaction when one-half to one-third of the acetyl groups of the acetyl-benzenes remain unreacted. At this point, the excess phosgene is removed. This can be done under vacuum at ambient temperature or the reaction mixture can be heated to expel the excess phosgene, preferably under reflux to prevent loss of solvent. During the initial reaction, some, but not all, of the α,α-dichloroethyl groups autogeneously dehydrohalogenate to the α-chlorovinyl group. If the reaction mixture is heated after, or simultaneously with the removal of phosgene, especially where pyridine remains in the solution, the α,α-dichloroethyl groups will dehydrohalogenate to α-chlorovinyl groups. The conversion of the α,α-dichloroethyl groups to α-chlorovinyl groups is not necessary since both groups readily dehydrohalogenated to the ethynyl group, but such conversion by heating does save on the amount of dehydrohalogenating agent. If desired, the α-chlorovinylbenzene can be separated from the unreacted acetylbenzene, and in the case of diacetylbenzenes, from the partially reacted product still containing one acetyl group, by distillation or the α-chlorovinyl compounds can be dehydrohalogenated using any of the well known dehydrohalogenating agents under dehydrohalogenating conditions to convert the α-chlorovinyl group to the ethynyl group and thereafter the acetylenic compounds separated from the balance of the reaction mixture and from each other. Any of the dehydrohalogenating agents well known to the art for converting chlorinated aliphatic compounds to acetylenically unsaturated aliphatic hydrocarbons can be used for this reaction. Typical but not limiting of examples of such reagents are the alkali metal hydroxides, alkali metal amides, etc.

In order that those skilled in the art may better understand my invention, the following examples are given by way of illustration and not by way of limitation.

EXAMPLE 1

A solution of 12.01 g. of dry, freshly distilled acetophenone and 7.91 g. of pyridine, which had been dried over potassium hydroxide pellets, and 100 ml. of chloroform, which had been dried and freed of ethanol by passing through an alumina column, was placed in a 250 ml. round-bottomed flask equipped with a stirrer, gas inlet tube and open to the atmosphere through a drying tube. Phosgene was introduced into the vapor phase from which it quickly dissolved in the stirred solution producing first a yellow color followed by a pink color and finally producing a white precipitate of the pyridine-phosgene complex. Cooling of the reaction vessel is provided to remove the heat generated by the dissolution of the phosgene. When this precipitation occurred, the flow of phosgene was stopped. A total of 43.6 g. of phosgene had been introduced as determined by weight difference. After three days at ambient temperature, only a small amount of the solid precipitate was still visible. Analysis by nmr spectroscopy showed there to be a molar ratio of unreacted acetophenone to α,α-dichloroethylbenzene to α-chlorostyrene of 56/15/29, respectively.

All of the phosgene and solvent were removed under vacuum at room temperature. After adding 100 ml. of chloroform to the residue, the solution was refluxed in a dry atmosphere for 24 hours. Analysis by nmr spectroscopy showed that the α,α-dichloroethylbenzene had been converted to α-chlorostyrene and the molar ratio of acetophenone to α-chlorostyrene was now 56/44, respectively. The reaction mixture was extracted with three 100 ml. portions of 0.5 M hydrochloric acid to remove pyridine and then with 100 ml. of water to which some sodium chloride was added to break an emulsion. After drying the organic layer with anhydrous magnesium sulphate and filtering, vapor phase chromatography showed the organic layer to contain acetophenone and α-chloro-styrene in the molar ratio of 55/45, respectively, the same molar ratio, within experimental error, previously found by nmr spectroscopy. After solvent removal, the organic liquid was chromatographed on a column of 150 g. of silica gel using freshly distilled hexane as eluting solvent. All of the α-chlorostyrene was removed from the column in the first 800 ml. of eluant and was completely free of impurities as determined by vapor phase chromatography. Removal of the hexane at room temperature gave 3.06 g. of pure α-chlorostyrene.

When the above example was repeated except the reaction of the phosgene-pyridine complex with the acetophenone was carried out for three days at 60° C. in a pressure vessel, the yield of α-chlorostyrene was only 50 percent of that attained when the reaction was carried out at ambient temperature and pressure.

EXAMPLE 2

In Example 1, the ratio of pyridine to acetophenone was 1:1. This example illustrates the use of excess pyridine to improve the yield of α-chlorostyrene. In the same type of apparatus as described in Example 1, phosgene was passed into a solution of 12.01 g. of acetophenone, 25.00 g. of pyridine and 100 ml. of chloroform until a total of 48.6 g. of phosgene was introduced as determined by weight difference. The reaction was allowed to proceed at ambient temperature and pressure with periodic sampling of the reaction mixture and monitoring of the amount of residual acetophenone by nmr spectroscopy. After 258 hours, there was approximately only 1 mole percent of the initial acetophenone present with a molar ratio of α-chlorostyrene to α,α-dichloroethylbenzene being 77/22, respectively. The reaction mixture was heated to reflux causing some solid precipitate to disappear as a considerable amount of phosgene was expelled from the reaction mixture. After 20 hours at reflux, nmr spectroscopy showed that all of the α,α-dichloroethylbenzene had been converted to α-chlorostyrene. The reaction mixture was worked up as described in Example 1, yielding 4.69 grams of pure α-chlorostyrene.

EXAMPLE 3

Using the same general procedure as described in Example 2, phosgene was passed into a solution of 8.11 g. of m-diacetylbenzene, 25.00 g. of pyridine and 100 ml. of chloroform until a total increase in weight of 47.6 g. was noted. After reacting for 258 hours at ambient temperature, the excess pyridine was removed by washing with water and the organic layer dried over anhydrous magnesium sulphate. Analysis by nmr spectroscopy showed the molar ratio of acetyl groups to α,α-dichloroethyl groups to α-chlorovinyl groups was 27/18/55, respectively. Vapor phase chromatography of the reaction mixture showed that the two major products were m-bis(α-chlorovinyl)benzene and m-(α,α-dichloroethyl)α-chlorostyrene with the former predominating, thus confirming the nmr spectral results. Both of these products are readily dehydrohalogenated with dehydrohalogenating agents to produce m-diethynylbenzene. Heating of the reaction mixture under reflux converts the α,α-dichloroethyl groups to α-chlorovinyl groups.

In the same manner as described above, p-diacetylbenzene can be reacted to produce p-bis (α-chlorovinyl)benzene and p-(α,α-dichloroethyl)α-chlorostyrene, which can be converted to p-diethynylbenzene. The various dehydrohalogenating agents may be aqueous alkali solutions or, preferably for ease of convenience, sodium amide in liquid ammonia. An illustrative example demonstrating the use of this dehydrohalogenating agent is shown in the following example.

EXAMPLE 4

To approximately 200 ml. of liquid ammonia in a 100 ml. round-bottomed flask fitted with a solid carbon dioxide-acetone condenser and blanketed with a nitrogen atmosphere was added 0.1 g. of ferric nitrate and 0.25 g. of freshly cut sodium metal. After all of the sodium metal had dissolved, oxygen was passed into the system to destroy the blue color and an additional 5.75 g. of sodium metal pieces were added during 5 minutes. After an additional 30 minutes, all the dark blue color was gone and a sodium amide suspension was present. A solution of 8.20 g. of m-bis(α-dichlorovinyl)benzene in 100 ml. of dry ether was added dropwise during 20 minutes causing the solution to become purple during the addition. The solution was stirred for 3 hours at the temperature of the refluxing liquid ammonia after which time, 100 ml. of water was added dropwise during 5 minutes to destroy any remaining sodium amide. After adding 50 ml. of pentane, most of the ammonia was allowed to evaporate and an additional 150 ml. of pentane and 150 ml. of water was added and the aqueous lower layer was neutralized with concentrated hydrochloric acid. After the organic layer was separated, it was dried over anhydrous magnesium sulphate and the pentane and ether were distilled leaving 4.68 g. of m-diethylnylbenzene.

Although the above examples have illustrated the preferred embodiments of my invention, it is obvious that variations may be made therefrom without departing from the scope of the invention. As mentioned previously, the phenylacetylenes produced by my process can be used as chain-stoppers in regulating the molecular weight of the polymers produced from the diethynylbenzenes, which are also produced by my process. A preparation of such polymers is shown in the above-identified Hay patent which is incorporated herein by reference. Other uses for the ethynylbenzenes prepared by my process will be readily discernible to those skilled in the art. It will also be apparent that various modifications can be made in this invention departing from the spirit or scope thereof. For example, the phosgene reaction can be carried on at a much lower temperature than room temperature. Other solvents which are inert to phosgene may likewise be used or, if desired, the starting acetylbenzene, if a liquid, can be reacted in the absence of a solvent and other inert solvents can be used in place of the liquid ammonia for suspending the alkali-metal amide and carrying out the dehydrohalogenation. These and other variations are within the intended scope of the invention as set forth in the following claims.

What I claim as new and desire to secure by Letters Patent of the United States is:

1. The process of producing

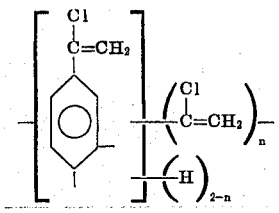

which comprises reacting

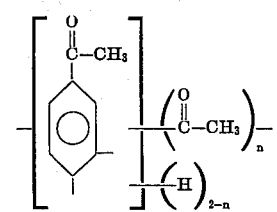

where $n$ is 0 or 1 with phosgene in the presence of pyridine.

2. The process of claim 1 wherein the yield of A is increased by heating the reaction mixture after the desired degree of reaction of B with phosgene is attained, to expel excess phosgene and dehydrohalogenate residual —$CCl_2$—$CH_3$ groups to —$CCl$=$CH_2$ groups.

3. The process of claim 1 where $n$ is 1.
4. The process of claim 2 where $n$ is 1.
5. The process of producing

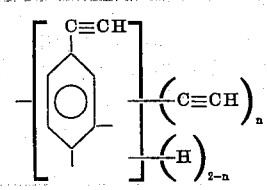

which comprises making

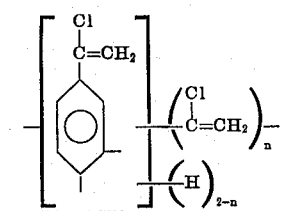

where $n$ is 0 or 1 by the process of claim 1 and thereafter reacting A with a dehydrohalogenating agent under dehydrohalogenating conditions.

6. The process of claim 5 where each $n$ is 1.
7. The process of claim 5 wherein after the production of A, and prior to the dehydrohalogenation reaction, the reaction mixture is heated to expel excess phosgene and converted residual —$CCl_2$—$CH_3$ groups to —$CCl$=$CH_2$ groups.
8. The process of claim 7 wherein $n$ is 1.

* * * * *

UNITED STATES PATENT OFFICE
CERTIFICATE OF CORRECTION

Patent No. 3,696,158                     Dated  October 3, 1972

Inventor(s)  Howard M. Relles

It is certified that error appears in the above-identified patent and that said Letters Patent are hereby corrected as shown below:

Claim 1, line 2, before the formula insert - A -, line 4, before the formula insert - B -; Claim 5, line 2, before the formula, insert - C -, line 4, before the formula, insert - A -; Claim 7, line 4, change "converted" to - convert -.

Signed and sealed this 1st day of May 1973.

(SEAL)
Attest:

EDWARD M. FLETCHER, JR.                ROBERT GOTTSCHALK
Attesting Officer                      Commissioner of Patents